(12) United States Patent
Pfahlmann et al.

(10) Patent No.: US 7,441,191 B2
(45) Date of Patent: Oct. 21, 2008

(54) METHOD FOR GRAPHICAL PRESENTATION OF OBJECTS AND TECHNICAL PROCESSES ON A SCREEN AND COMPUTER PROGRAM PRODUCT USED FOR THIS PURPOSE

(75) Inventors: Lothar Pfahlmann, Baiersdorf (DE); Stephan Schaer, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 441 days.

(21) Appl. No.: 11/152,871

(22) Filed: Jun. 15, 2005

(65) Prior Publication Data
US 2005/0283728 A1 Dec. 22, 2005

(30) Foreign Application Priority Data
Jun. 15, 2004 (DE) .................. 10 2004 028 793

(51) Int. Cl.
*G06F 3/00* (2006.01)
*G06F 3/14* (2006.01)
(52) U.S. Cl. ............... 715/711; 715/856; 715/862; 345/163; 345/172
(58) Field of Classification Search .......... 715/708, 715/711, 715, 764, 765, 781, 804, 805, 838, 715/856, 862; 345/163, 168, 172
See application file for complete search history.

(56) References Cited

U.S. PATENT DOCUMENTS

| | | | |
|---|---|---|---|
| 5,754,176 A * | 5/1998 | Crawford | 715/711 |
| 5,995,101 A | 11/1999 | Clark et al. | |
| 6,504,556 B1 * | 1/2003 | Myers | 715/839 |
| 6,948,126 B2 * | 9/2005 | Malamud et al. | 715/715 |
| 7,185,290 B2 * | 2/2007 | Cadiz et al. | 715/838 |
| 2002/0163545 A1 * | 11/2002 | Hii | 345/838 |

FOREIGN PATENT DOCUMENTS

| | | |
|---|---|---|
| DE | 197 40 974 A1 | 3/1999 |
| EP | 1 241 568 B1 | 5/2004 |

* cited by examiner

*Primary Examiner*—X. L Bautista

(57) ABSTRACT

A method is provided for graphical presentation of objects and/or technical processes on a screen, as well as an editor implementing the method being provided. A tooltip appears when a pointing device such as a computer mouse for example uses its mouse pointer to remain for a predetermined time over a predetermined section of the display area, and that the tooltip graphically presents at least a part of the object and/or of the process in a modified way compared to that shown in the display area. In this way, with the aid of the tooltip, the same object and/or the same technical process can be presented in a number of views.

6 Claims, 5 Drawing Sheets

METHOD FOR GRAPHICAL PRESENTATION OF OBJECTS AND TECHNICAL PROCESSES ON A SCREEN AND COMPUTER PROGRAM PRODUCT USED FOR THIS PURPOSE

CROSS REFERENCE TO RELATED APPLICATIONS

This application claims priority to the German application No. 10 2004 028 793.7, filed Jun. 15, 2004 and which is incorporated by reference herein in its entirety.

FIELD OF INVENTION

The invention relates in general to the presentation of screen contents by a computer and to display programs suitable for this purpose. In particular the invention relates to the graphical presentation of objects or technical processes by graphical editors.

BACKGROUND OF THE INVENTION

Technical processes or technical objects are mostly illustrated in the form of technical drawings, flowcharts and so forth. To take account of the three-dimensionality of the objects or to present the given processes comprehensively, a number of presentations are selected as a rule. Different views are frequently selected for objects, for example a perspective view, a side view, or a view of the object from above or prepared sections along predetermined lines. With processes, which means working or manufacturing procedures, presentations at a number of levels of abstraction are mostly required. Thus a first presentation can be selected to display the entire process, for example in the form of a flowchart. A second presentation can represent a sub process, which for example is an individual processing step in the overall process, and which corresponds to an element in the flowchart.

Since the screen display is limited it is mostly necessary to switch between these views when creating the different presentations. In this case graphical editors are used with which different views can be shown in resizable windows. Selecting the corresponding entries in drop-down menus of the relevant editor selects the views, moves windows into the foreground and sets their size.

Tooltips are generally known for graphical user interfaces, such as those of the Windows® or Macintosh® operating system. If a mouse pointer remains for a predetermined time over a predetermined part of the screen area, a display area appears which provides explanatory information about a program function. It is thus known for programs to have various buttons which are provided with a pictogram. If the mouse pointer dwells sufficiently long over such a pictogram, the given display area appears and clarifies or explains the program function that can be selected by clicking the button.

Application U.S. Pat. No. 5,995,101 discloses a tooltip for which the degree of execution capability increases over time. If the mouse point only remains for a short time in the said predetermined part of the screen area, i.e. in the catch area, the program function is explained in just a few words. If the mouse pointer remains in the catch area for a longer period, a second tooltip appears with a longer explanatory text. If the mouse pointer remains in the catch area for even longer, a tooltip which uses an image or a video to give a detailed explanation of the functions of the button appears.

SUMMARY OF THE INVENTION

The underlying object of the invention is to allow an ergonomic illustration of technical objects or technical processes in different representations on a screen.

This technical problem is resolved by the features of the independent claims. Advantageous developments are reproduced by the features of the dependent claims or can be taken from the description in conjunction with the Figures.

The invention has recognized that the illustration of technical objects or technical processes using various displays on a screen, especially a computer screen, can be improved if a tooltip appears when an input device is held for a predetermined period of time over a predetermined area of the display and that the tooltip graphically displays the object and/or the process in a modified way compared to the display area.

The invention thus achieves the above object by using a tooltip to present graphical information which contains the same object or the same process as the display area mentioned.

A computer mouse, a trackball, a light pointer, a joystick, a graphics tablet or similar can be used as an input device, with the aid of which an element of the screen area is defined and selected or chosen. Activating the element displays the tooltip or hides the tooltip if it is already displayed in the display area.

For an object shown on the display area the graphical information displayed using the tooltip can be another view of this object. If for example the display area shows a side view of the object, the tooltip can show the same object in a perspective view. It is also possible for display area and tooltip to show the same object in the same view, but for the tooltip to show the object in greater detail and/or at a different scale, and especially enlarged.

If a manufacturing or work process is shown graphically, the tooltip can illustrate another level of abstraction of this method. Thus for example the primary display area can show the overall process whereas the tooltip only shows part of the process. The tooltip can also show one or more procedural steps of the overall method in greater detail or can display additional stored information. In the latter case for example the process time required for the relevant step is displayed in order to optimize the overall process from the time standpoint.

As with known tooltips, the tooltip is displayed if a mouse pointer remains for a predetermined time in the catch area. The duration can typically lie within a range of between half a second and three seconds, and is preferably able to be set in the editor by the user. The tooltip is hidden again if the mouse pointer leaves this catch area or if the mouse pointer is still in the catch area but a predetermined period of time has elapsed. The source code for the tooltip representing the additional graphical information can be permanently integrated into the source code of the editor. However there is also the option of implementing the tooltip as a DLL (dynamic link library) file so that it can also be made available via a predefined interface to other programs.

With the proposed method a tooltip thus ensures technical intermeshing of the primary display area with the further presentation of the tooltip. This means that associated technical representations of the same object or of the same technical process do not have to be assembled using a number of non-associated windows and carefully brought into position with the aid of drop-down menus. This method allows further presentations to be retrieved quickly and explicitly which produces the desired ergonomic improvement.

The tooltip used in accordance with the invention is preferably implemented in a display window using at least one specified user action, for example pressing at least one key of a computer keyboard and/or clicking on a tooltip. This display window can be edited and the content of the display window modified in this way can be stored. The modified content of the display window can be provided as a modified tooltip. In this way provision is made for converting a tooltip into a normal display window and vice versa. This conversion option further increases the operator convenience because the user, if he wishes to modify a presentation, does not first have to make the effort of generating a display area by selecting a menu item within a window structure of an editor.

The method according to the invention is especially suitable for presenting the functional, organizational and/or timing sequence of a manufacturing or work process. This information can be presented in any given way, and thus for example in the form of a flowchart.

The method is preferably performed with a computer program product which can be loaded directly into the internal memory of a digital computer. To this end the computer program product includes program or software code sections with which the corresponding procedural steps can be executed with the aid of the tooltip if the program is running on a computer. The computer program product can in this case be stored on a data storage medium such as for example a CD or a DVD or can be stored in a computer memory such as the RAM. Furthermore the software code sections can be transmitted over corresponding data networks such as LANs, WANs or the Internet with the aid of an electrical carrier signal.

The present method as well as the associated editor will be explained in greater detail below on the basis of exemplary embodiments with reference to the drawings.

DETAILED DESCRIPTION OF THE INVENTION

Figure 1:
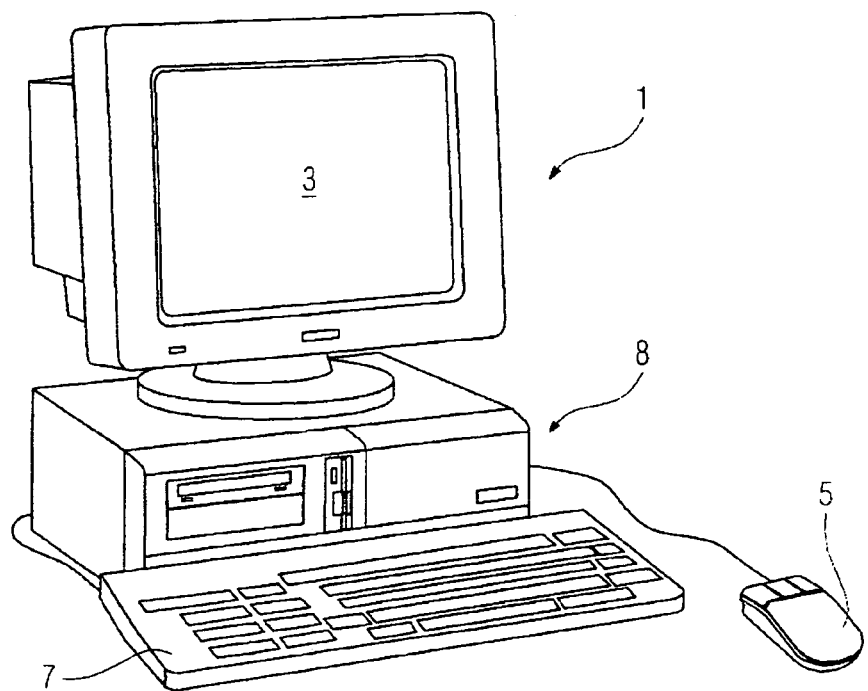
FIG. 1 shows a workstation for using the graphical editor according to the prior art.

FIG. 1 shows the area of application of the present invention, namely the presentation of screen contents by a computer 8, in a perspective view. The computer 8 has a mouse 5 and transfers the data to be presented to a screen 1. The screen 1 presents the data in one or more display windows 3.

Figure 2:
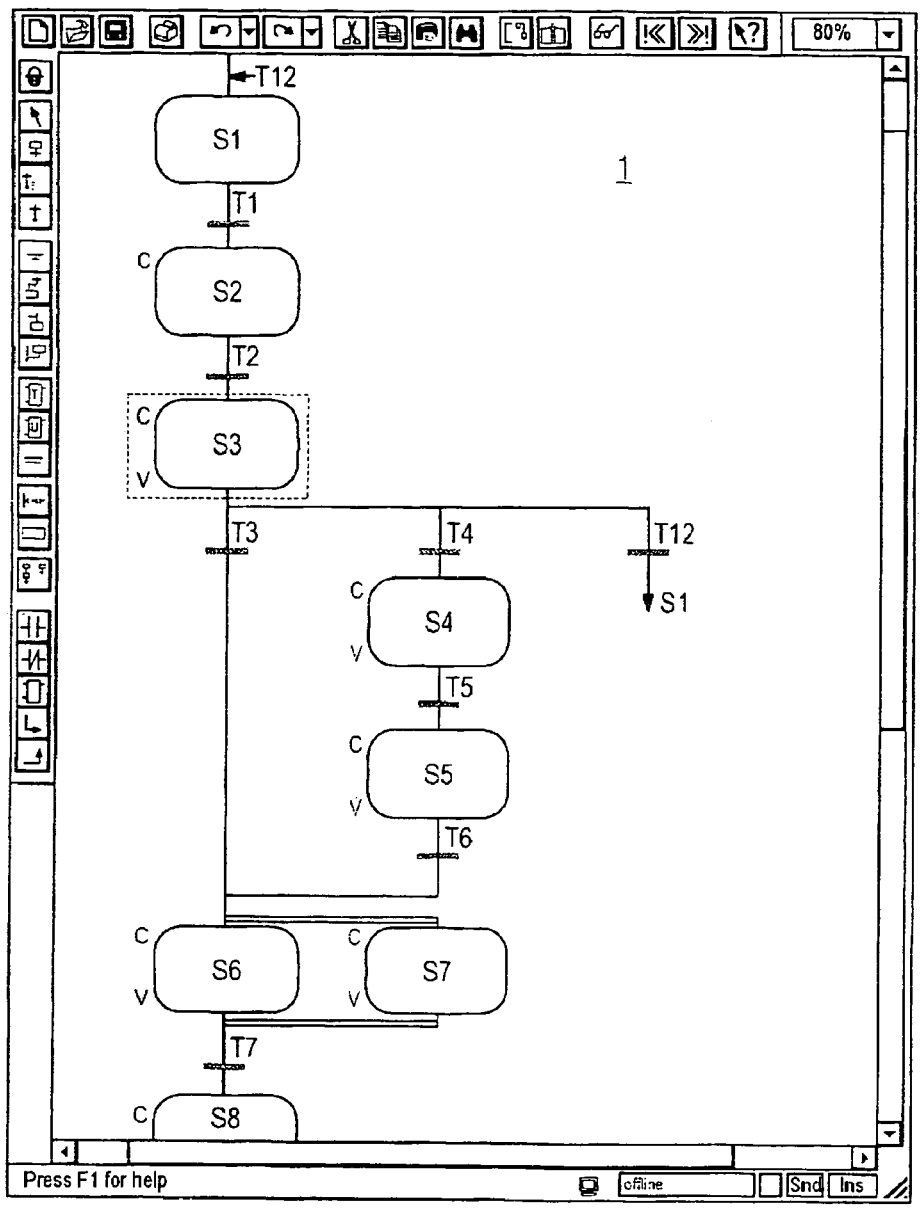
FIG. 2 shows a flowchart for the working steps of a wash line.

FIG. 2 shows a window of the graphical editor S7GRAPH which is marketed commercially by the applicant of the present invention and which runs under the Microsoft Windows® operating system. In this window stations S1, S2, . . . S8 are shown in a carwash lane. These stations are S1 (entry into the carwash), S2 (start of auto wash), S3 (rinse), S4 (prewash), S5 (back), S6 (main wash), S7 (underbody wash), and S8 (final rinse).

To uniquely identify the position of the vehicle within the carwash, but also to determine the status of system components, there are sensors between the vehicle stations that can be interrogated. With the aid of these sensors it is possible to find out whether particular conditions, mainly called transition contents T1, T2 . . . T12, are fulfilled. For example transition contents T12 can be used to find out whether a vehicle has driven into the carwash. Another transition content would be whether a washing brush had been moved into its required position or whether an underbody wash had been started.

Furthermore there is one more locking condition C relating to each station, i.e. it is possible to ask whether a protective device has been activated. For example it is possible to inquire whether a protective grid has been moved into its required position or whether an emergency switch has been pressed. Furthermore there are monitoring conditions V, with the aid of which different monitoring actions can be programmed, for example maximum monitoring or delay times for the relevant steps.

For the graphical presentation of the sequence of washing a vehicle in the carwash the monitoring conditions V and the locking conditions C are of particular interest. If for example an error search is to find out why station S3 is no longer operating correctly, as well as the overview presentation shown in window 3, the detailed information for the monitoring conditions V is also required.

Figure 3:
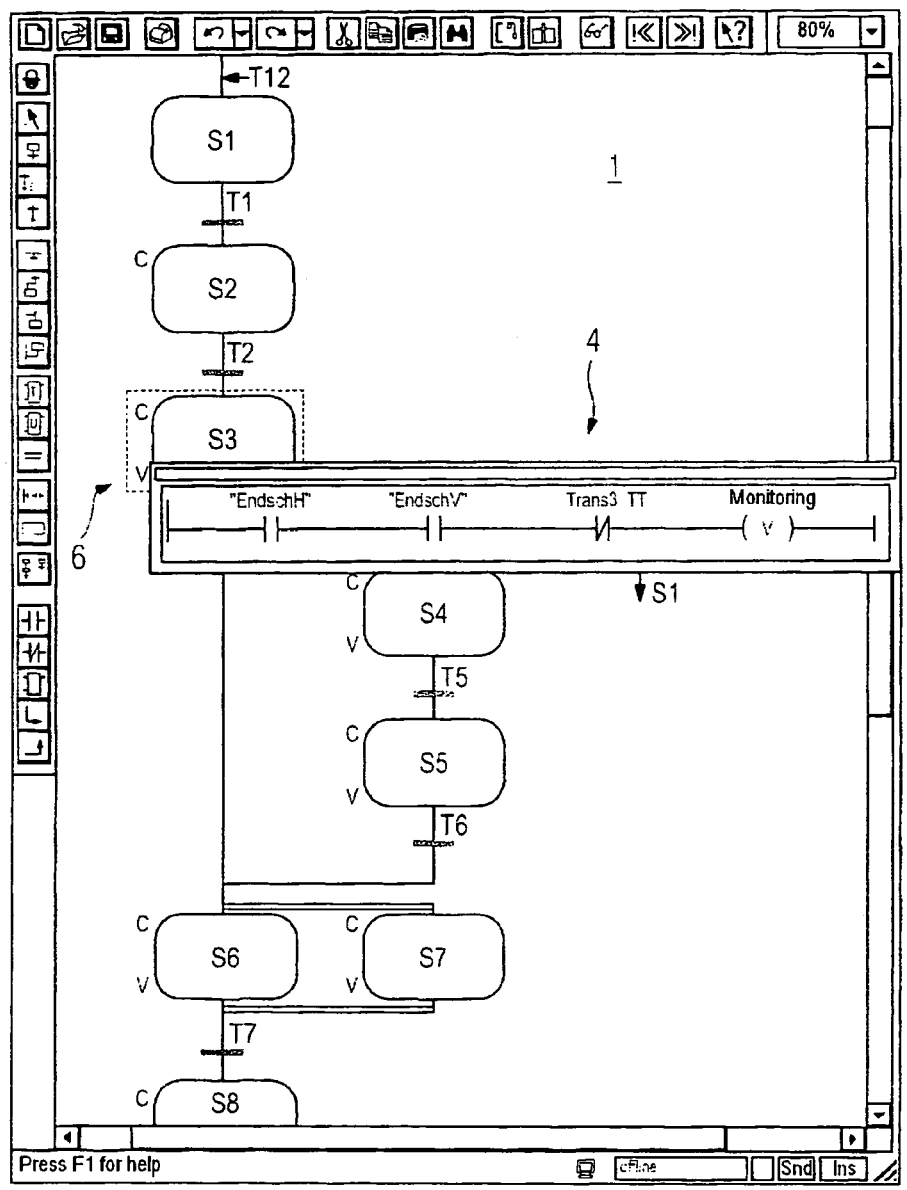
FIG. 3 shows a detailed diagram of step S3, created by clicking on a catch area "V"

This is done according to the invention so that once a mouse pointer remains in a catch area 6 over the letter V a tooltip 4 appears, cf. FIG. 3. The catch area 6 is a rectangular area selected so that it is just large enough to accommodate the letter V. The dwell time amounts here to between ½ sec and 3 sec. and can be set by the user in the S7GRAPH editor modified for this purpose.

The source code of the tooltip is permanently integrated into the source code of the editor. Tooltip 4 shows graphical detailed information of the same process which is also shown by display window 3. Here tooltip 4 shows the status of switches and valves in the area of station S3, named "EndschH", "EndschV", "Trams 3.TT" and " ", but with functions which are not of any greater interest within the framework of this invention.

Figure 4:
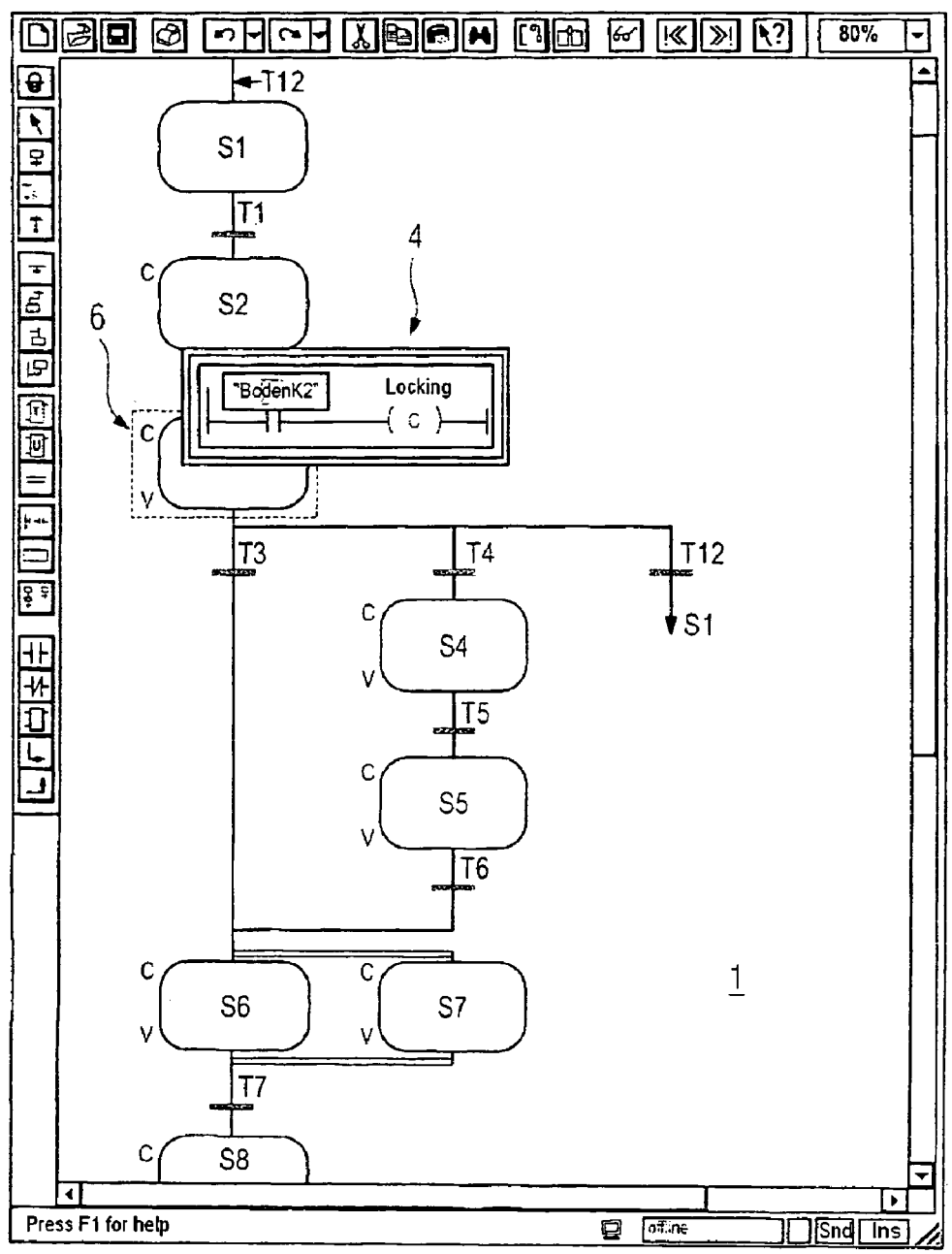
FIG. 4 shows a detailed diagram of step S4, created by clicking on the catch area "C".

In the typical case above the locking conditions C are also of interest. If a mouse pointer remains in a catch area 6 over the letter C, a tooltip 4 appears, cf. FIG. 4. Here too the catch area is a square area which is chosen to be just large enough to accommodate the letter C. This can be edited simply by clicking on it. In the present case this can be recognized from the fact that the letters "BodenK2" are shown partly inverted in color.

Figure 5:
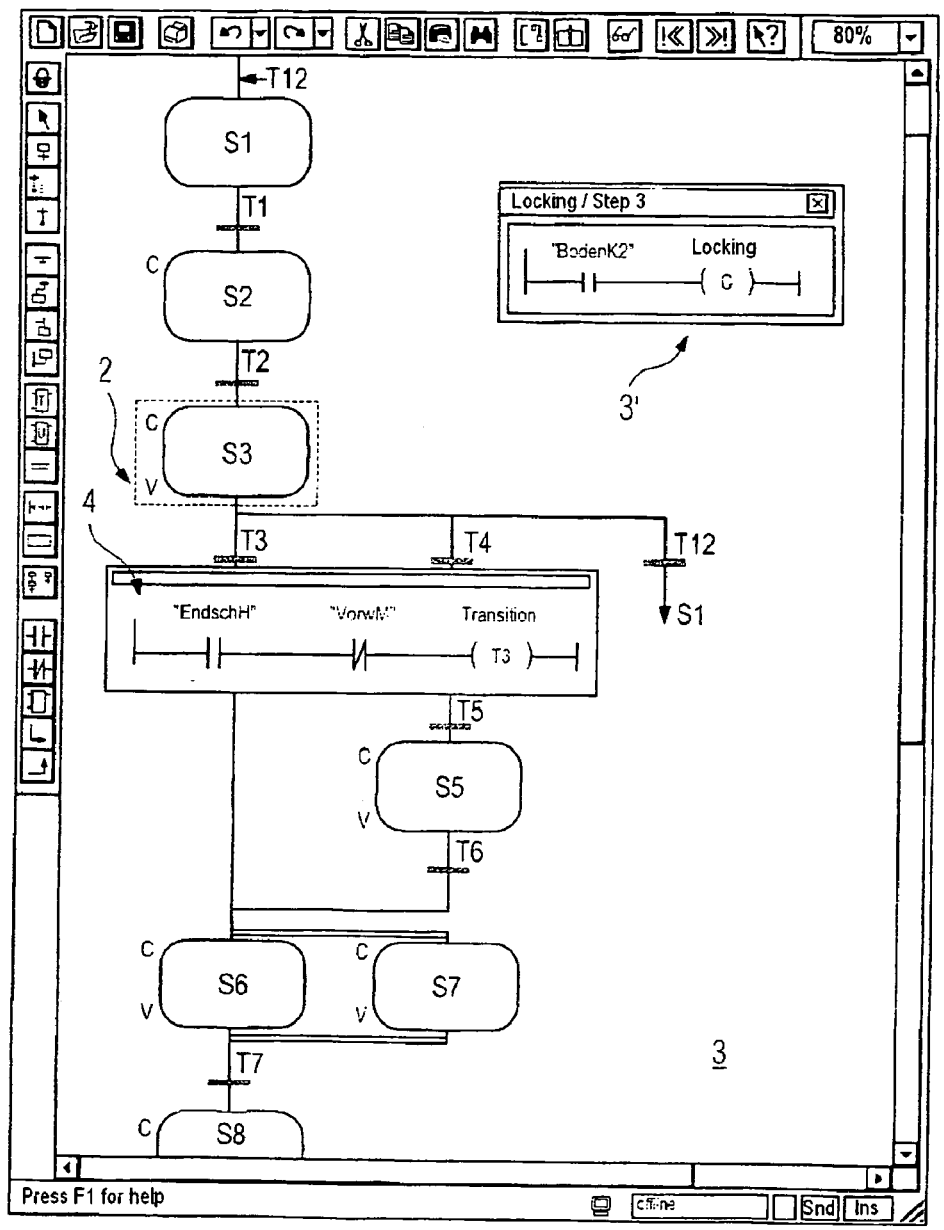
FIG. 5 shows a graphical display of step S3.

FIG. 5 shows a display window 3 in which information for step S3 is presented graphically. Remaining in the catch area "V" to the left next to the symbol S3 generates a tooltip which has been moved into a second display window 3' by clicking on it. Subsequently by remaining in the catch area "T3" below S3 a tooltip 4 is created which discloses further details about the transition T3 (continuation condition). As is usual, the tooltip 4 overlays the previous contents of display area 3.

Annex A shows a schematic programming instruction for creating and administering a tooltip window. This programming instruction is integrated into the source text of the editor. In line 1 an initial inquiry is made as whether the mouse pointer is in the catch area of the tooltip. In line 3 the data which is to subsequently by graphically presented in the tooltip window is fetched from a corresponding document on the hard disk. Subsequently a suitable window is created (line 4). In line 5 the data is interpreted and presented graphically in the tooltip window. Line 6 defines that the tooltip is shown at the mouse position.

With lines 9 and 10 a movement of the mouse pointer is captured and for the case where the mouse pointer moves outside the catch area 6 and also the tooltip window 4 is not fixed in its position, the tooltip window 4 is closed (line 12).

Annex A

Schematic program instruction for creating and administering a tooltip window:

```
if (Mouse in CatchArea )
{
    GetDocumentData_for_ToolWindow ( );
    CreateToolWindow ( );
    SetData_for_ToolWindow ( );
    Show_ToolWindow at_MousePos ( );
}
if (Mouse Move AND MousPos is outside CatchArea AND
    ToolWindow is NOT pinned)
{
    Hide_and_Delete_ToolWindow ( );
}
```

The invention claimed is:

1. A method for configuring a graphical user interface in a computer system to provide a graphical presentation of an object and/or a technical process on a screen of the graphical user interface, wherein the object and/or the technical process are presented on a display area of the screen, the method comprising:

providing a tooltip if an input device remains for a predetermined time over a predetermined area of the display area, wherein the tooltip shows at least a part of the object and/or of the process graphically in a modified way compared to the graphical presentation of the object and/or a technical process shown on the display area, wherein a functional, organizational and/or chronological sequence of a manufacturing or working process is shown by the tooltip, and wherein the tooltip shows another directional view of the object compared to a directional view of the object shown in the display area;

monitoring at least one condition indicative of a status of the functional, organizational and/or chronological sequence of the manufacturing or working process;

determining the status of the functional, organizational and/or chronological sequence of the manufacturing or working process based on the monitored at least one condition; and displaying on the tooltip the status of the functional, organizational and/or chronological sequence of the manufacturing or working process.

2. The method according to claim 1, further comprising: converting the tooltip via a predetermined user action in a display window.

3. The method according to claim 2, wherein the converting is caused by pressing at least one key on a computer keyboard and/or by clicking on the tooltip with a computer mouse.

4. The method according to claim 3, wherein a content of the display window is modified by a user, wherein the display window is closed, and wherein the content of the display window is available via a tooltip.

5. The method according to claim 2, wherein a content of the display window is modified by a user, wherein the display window is closed, and wherein the content of the display window is available via a tooltip.

6. A computer program product containing software codes sections for configuring a graphical user interface in a computer system to provide a graphical presentation of an object and/or a technical process on a screen of the graphical user interface, wherein the object and/or the technical process are presented on a display area of the screen, the computer program product comprising:

computer-readable software code sections for generating a tooltip when an input device remains for a predetermined time over a predetermined area of the display area, wherein the tooltip shows at least a part of the object and/or of the process graphically in a modified way compared to the graphical presentation of the object and/or a technical process shown in the display area, wherein a functional, organizational and/or chronological sequence of a manufacturing or working process is shown by the tooltip, wherein the tooltip shows another directional view of the object compared to a directional view of the object shown in the display area;

computer-readable software code sections for monitoring at least one condition indicative of a status of the functional, organizational and/or chronological sequence of the manufacturing or working process;

computer-readable software code sections for determining the status of the functional, organizational and/or chronological sequence of the manufacturing or working process based on the monitored at least one condition; and computer-readable software code sections for displaying on the tooltip the status of the functional, organizational and/or chronological sequence of the manufacturing or working process.

* * * * *